Jan. 31, 1950     R. HARDY     2,495,718
SENSE INDICATOR FOR MANUALLY CONTROLLED RADIO
DIRECTION FINDER SYSTEMS

Filed July 18, 1947     3 Sheets-Sheet 1

Inventor
RENÉ HARDY

By     *R. P. Morris*

Attorney

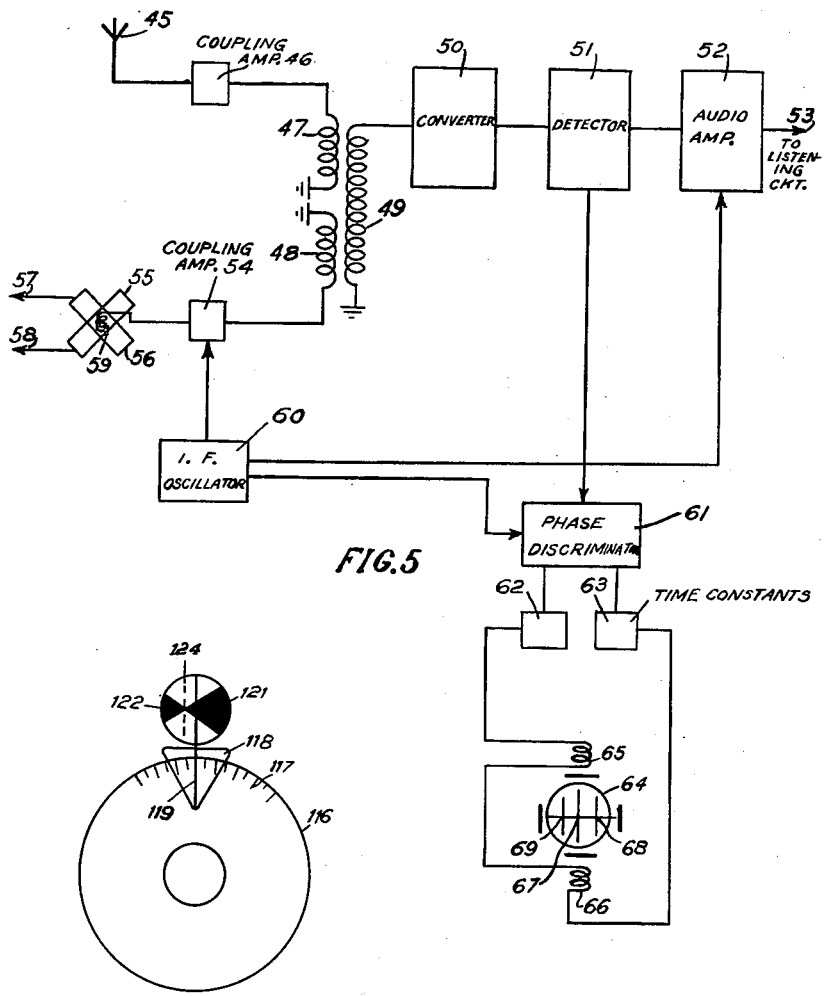
FIG.5
FIG.8
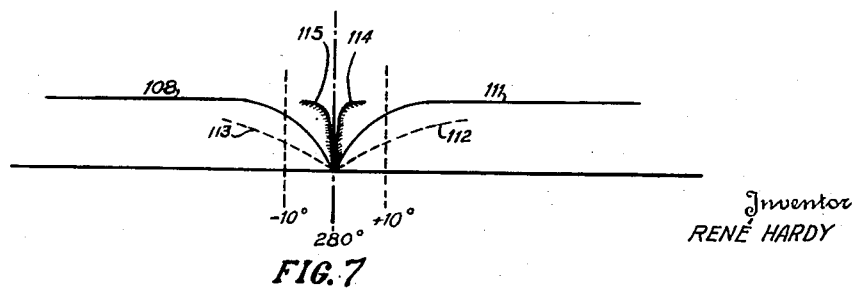
FIG.7
Inventor
RENÉ HARDY

Patented Jan. 31, 1950

2,495,718

UNITED STATES PATENT OFFICE 2,495,718

SENSE INDICATOR FOR MANUALLY CONTROLLED RADIO DIRECTION FINDER SYSTEMS

René Hardy, Paris, France, assignor to International Standard Electric Corporation, New York, N. Y., a corporation of Delaware Application July 18, 1947, Serial No. 761,926
In France November 17, 1941

Section 1, Public Law 690, August 8, 1946
Patent expires November 17, 1961

3 Claims. (Cl. 343—115)

This invention relates to improvements, changes, modifications and additions to the radio direction finder systems described in the copending U. S. patent application filed on May 28, 1943, by the applicant under S. N. 488,877, now Patent No. 2,468,064, issued April 26, 1949.

In this application, a description was given of manually operated radio direction finder systems which were capable of giving directly the true bearing of a radio transmitter (azimuth and sense) without any need, on the part of the operator, for throwing an ambiguity eliminating or sense key, or to perform any operation other than said taking of the bearing. These systems also permit to listen in to the station, regardless of the position of the orientable element and during its operation.

More specifically, the manually operated finders provided in the aforementioned application comprised means for modulating in amplitude, through the use of a low frequency modulating current, either the high frequency current coming from the vertical listening and sense antenna, or the high frequency current coming from the directive array; and for superimposing this modulated current, with an appropriate phase relationship between them, on the current of constant amplitude coming, either from the directive array, or from the sense antenna respectively. Means were thereafter provided for comparison of the relative phases of the low frequency modulating current on the one hand and the low frequency envelope of the current produced as a result of the above mentioned superimposition on the other hand, after a frequency change and detection, and directly to obtain from that comparison the sense indication desired. The invention also described means for continuous control of the amplitude of the modulated current in function of the angular position of the rotor of the finder goniometer, the modulating current canceling itself at the same time as the current induced in said rotor. Finally, in order to permit simultaneous listening in to the station, means were provided to eliminate, at the receiver output, the variations in the level of the low frequency current due to the above mentioned local modulation of the high frequency current.

In the said patent application, S. N. 488,877 the embodiments which were described as an example had a more specific bearing on the use of neon tubes to supply the direct indication of the bearing sense. This type of indicator was not meant, however, to be taken as a limitative example, and the specification pointed to the possibility of using, among other devices, some cathode ray tubes as sense indicators.

Accordingly, the present invention, has, as its general object, to provide manually operated radio direction finder devices which make use of the features described in the above identified copending application and in which the sense indicators are cathode ray tubes.

Some other objects of this invention are also to be found in the provision of certain types of operation and of circuits for cathode ray tubes that are particularly well adapted to the case of their utilization as bearing sense indicators in the above mentioned manually operated radio direction finders.

Another object of the invention is to provide indicators or goniometers giving simultaneously the bearing of a transmitter and a sense, and permitting to obtain a progressive indication, in other words making it possible to appreciate the direction and sense of the bearing with a great deal of accuracy, since the indicator which determines the sense also indicates the point of minimum reception by the progressive deflection of a luminous index and passing before a stationary reference point.

Accordingly, in the manually operated radio direction finder systems which are described in the above identified application, means are provided to obtain, on a cathode ray indicator screen, a pattern having an amplitude which is a function of the mean value of the voltage coming from the directive arrays, while the position of said pattern on the screen, for instance with relation to its center, is controlled by the phase relationships between the currents which come respectively from said directive arrays and non-directional arrays, said currents being permanently combined in the manner described in the above application. In this case, the cathode ray tube will serve, not only as a null indicator as the goniometer dial is rotated (an indication which will duplicate the usual aural null indication), but also as a sense indicator, for direction of pattern displacement with relation to the zero point will indicate, in a direct and instantaneous manner, whether the currents coming from the directional and non-directional aerials are in phase or in opposition, and thus whether the bearing read is true or wrong by 180 degrees.

These means, as well as yet some more, are characteristic of the systems of this invention, and they will be described in detail in the following description, given in conjunction with the attached illustrations, in which:

Figure 5 is a schematic of a direction finder receiver, with a control circuit for the resting position of the spot of the associated indicator;

Figure 7 shows graphically certain pattern shifts of the direction finder of the invention; and Figure 8 shows an indicator and goniometer dial.

Figure 1:
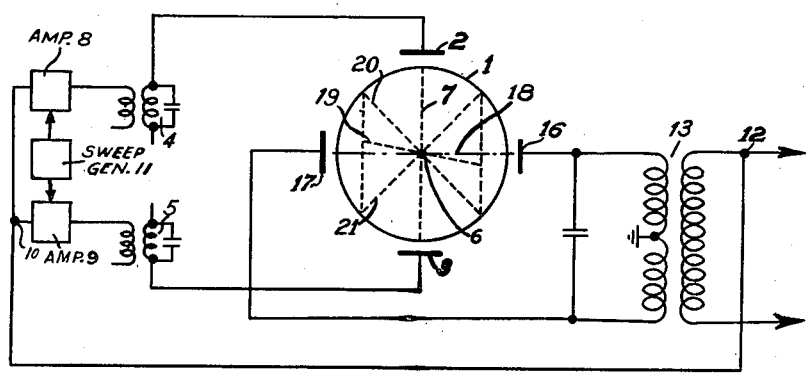
Figure 1 shows a typical circuit for a cathode ray indicator tube which operates according to certain characteristics of the invention.

Figure 1, to which reference should now be made, is a schematic of an embodiment which is not to be interpreted as being limitative. In this embodiment, use is made of a cathode ray tube such as 1, having four deflection plates 2, 3 and 16, 17. Plates 2 and 3 are connected respectively to two intermediate frequency transformers 4 and 5, each one of which is coupled to the output of an amplifier 8 or 9. The intermediate frequency is fed in parallel into amplifiers 8 and 9 at point 10. Said intermediate frequency voltage, also applied to a point 12 in the circuit is supplied by the circuits of a direction finder receiver (not shown), and point 12 also serves to feed another intermediate frequency transformer 13, connected to deflection plates 16 and 17. The voltages thus applied must be either in phase or in opposition, but cannot have any other phase difference. Provision can be made to have corrective networks for that purpose, these not being shown since their arrangement is well known to the prior art.

If the intermediate frequency voltages impressed on plates 16 and 17 alone were to control the position of spot 6 of the cathode ray indicator tube, this spot would trace a straight line such as 18, which would constantly be luminous and horizontal, as shown on the illustration. Line 18 would be stable by reason of the rapidity with which the spot sweeps its length, since the frequency of deflection would be of the order of 500 kc. By applying at this point, by means of amplifiers 8 and 9, some intermediate frequency voltages on plates 2 and 3, the intermediate frequency voltages thus applied having a small amplitude with relation to that applied on plates 16 and 17, the combination of these two rectangular deflecting forces will give, as a resultant, a slightly slanted line such as 19. Said line 19 will obviously have such an aspect only if the intermediate frequency voltages are in phase or in opposition phase. If this were not the case, line 19 would be transformed into an ellipse of variable eccentricity. It is preferable, but not indispensable, for the purposes of the invention, to keep the above mentioned voltages either in phase or in opposition, in order to obtain a straight line such as 19.

If the amplitudes of the intermediate frequency voltages impressed on plates 2 and 3 are substantial as compared to those impressed on plates 16 and 17, the result will be, for instance, a steeply slanted line such as 20 or, by inverting the phase of the voltage applied to plates 2 and 3, a line such as 21.

By effecting a single vertical deflection by means of plate 2, for instance, by shorting out plate 3, it is clear that a similar trace can be obtained.

If the amplification gain of amplifiers 8 and 9 be now controlled by a circuit such as 11, which permits progressive and alternate operation of amplifiers 8 and 9 at a continuous and fairly rapid rhythm, it is possible, successively to obtain lines 20 or 21, passing through all intermediate slants, for instance as shown for lines 18, 19, etc. . . . In other words, the line thus obtained will oscillate around central point 6 at a speed equal to the frequency of the current which is supplied by sweep generator 11.

If the wave shape of the sweep current be rectangular, for instance, line 20 will quickly move on to position 21 and, provided the speed be sufficient, lines 20 and 21 will be seen to appear simultaneously on the screen of the cathode ray tube. If the sweep voltage, on the contrary be of a progressive wave shape, say a sine wave or any other form presenting a series of intermediate values, the result will be two luminous triangles, the apices of which meet at point 6.

Figure 2:
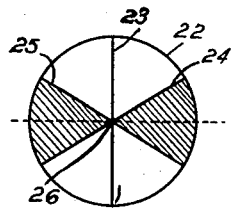
Figure 2 shows the null reading obtained by means of the circuit of Figure 1.

A cathode ray tube operating in the above mentioned manner is provided as the indicator in the radio goniometer direction finder systems described in the above patent application. Figure 2 shows the screen of such an indicator tube. Screen 22 has a vertical reference axis 23 and the pattern obtained on this screen consists of two lines such as 24 and 25, oscillating around point 26 with sufficient rapidity to show two permanently luminous surfaces.

In order to show adjustment or a null reading, and according to the rotation of the goniometer dial or of the directive array, the shape of the pattern made up by the oscillation of lines 24 and 25 will shift laterally and intersecting point 26 of lines 24 and 25 will move to the right or to the left of reference line or axis 23, being exactly on said line only for the accurate bearing reading. When the dial is rotated, to the right, for instance, point 26 will move to the right of axis 23, and when the dial is rotated to the left, point 26 will move to the left. However, if point 26 shifts toward the left as the dial is turned to the right or vice-versa, the reading must be corrected by 180°. The motion of point 26 with relation of reference line 23 is progressive and there are only two positions of the finder, 180 degrees apart, for which the spot passes over line 23, the sense of motion of the spot making it possible immediately to eliminate the ambiguity.

When the receiver which generates the intermediate frequency is not tuned to any particular station, the pattern of Figure 2 is reduced to a point. The two triangles of the pattern are formed only when the receiver is tuned to a transmitter and the size of the pattern thus obtained parallels the level of said signal. The position of the pattern with relation to line 23 makes it possible to take a null reading to take a bearing, in other words, to take a bearing. To shift the pattern, use can be made, preferably of the device shown schematically, as an illustration, in Figure 3.

In that figure, cathode ray tube 39 has two pairs of deflecting plates 27—28 and 29—30. Independently of these deflecting elements, it is possible to provide a double magnetic circuit such as 35, connected to two current sources symmetrical with relation to the midpoint of said circuit. The spot, in the absence of any current in circuit 35, stays at resting position 36—for instance the center of the fluorescent screen of tube 39. When a direct current is applied to one of the deflecting coils, say 35, the spot shifts, for example, to position 37. By changing the polarity of this current source, the spot is shifted to the other side, to position 38 for instance.

By using the two deflecting elements 35 and applying equal voltages to each one of these coils, the two equal and opposite attractive forces maintain the spot centered. When, on the contrary, a difference is created in the applied voltages and, according to which one is greater than the other, the spot shifts toward point 37 or point 38.

Figures 3, 4:
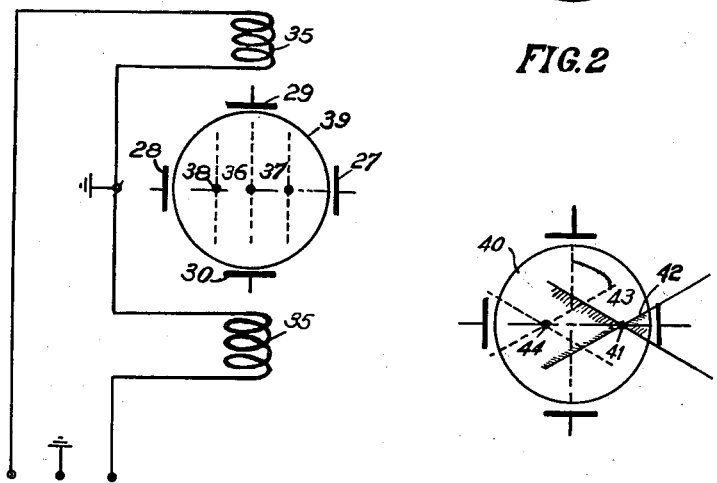
Figure 3 illustrates an example of a cathode ray indicator tube arrangement giving a pattern whose position varies according to the phase.
Figure 4 shows the phase indication given by the device of Figure 3.

In the indicator shown on Figure 4, for instance, the whole of pattern 42 obtained on the screen of cathode ray tube 40, in the form of two triangles having a common apex 41 to the right or left of a reference line 43, can be centered with relation to said reference line or brought to the right or left of it with the center at 41 or 44, by sending suitable biasing voltages through the magnetic deflection elements.

This control of the pattern position is obtained by means of a differential circuit which makes it possible to send, through the magnetic deviation circuits mentioned above, respective deflecting voltages which depend on the position of the goniometer dial, in other words which make it possible to shift the position of pattern 42 by a rotation of the dial, the pattern passing to the right or left of vertical reference line 43 according to the relative phase angles of the antenna and loop currents of the input circuit of the radio direction finder. An example of such an embodiment will now be described with relation to Figure 5.

On this figure, vertical antenna 45 is connected to a coupling or amplifying circuit 46, itself connected through primary winding 47 and secondary winding 49 of a transformer to a frequency changing receiver 50. A detector circuit 51 follows said receiver, as well as an audio or low frequency amplifier 52. A listening circuit 53 is connected to the output of said amplifier.

The radio direction finder circuit is made up of two wave collecting elements having crossed field patterns 57 and 58, connected for instance to the two rotors, 55 and 56, of a goniometric finder, a third rotor of which 59 is connected to input circuit 49 of receiver 50 by means of a coupling or amplifying circuit 54 and primary winding 48.

The current which results from the superimposition, with a suitable phase relationship, of the radio or high frequency currents coming from windings 47 and 48—in other words from vertical antenna 45 and rotor 59 of the finder respectively—is amplified by receiver 50. During one half revolution of rotor 59, the high frequency currents induced in winding 49 are in opposition of phase, while they are in phase during the other half revolution, all the usual precautions being taken to maintain these phase relationships with all due precision—by shifting the phase of one of the currents by 90 degrees.

Coupling or amplification circuit 54 is of the type described in the above copending application and consists of two tubes connected in opposition when they have identical potentials, pass no radio or high frequency current whatsoever. However, when they are modulated by a sine wave voltage, they pass a radio or high frequency voltage the amplitude of which is modulated in the form of a sine wave in winding 48 for instance. To this end, circuit 60 can consist, as described in greater detail in the copending application, of a low frequency oscillator supplying a frequency of the order of 100 C. P. S. for instance. In such conditions, according to the phase angle of the currents induced in rotor 59, one obtains in receiver 50, and accordingly on the detected envelope curve of circuit 51, a low frequency modulation at 100 C. P. S. the phase shift of which, with relation to that of the low frequency sine wave supplied by generator 60, depends on the phase angle of the high frequency currents induced in rotor 59, since they oppose those coming from circuit 46 and antenna 45 or, on the contrary, add up with them.

The sine wave supplied by generator 60 and the detected modulation envelope coming from receiver 51 are applied to a phase discriminating circuit 61. The detected and filtered voltages, picked up by means of time constant circuits 62 and 63 at the output of phase discriminating circuit 61, then have respective amplitudes which depend on the phase of the low frequency 100 C. P. S. current supplied by the envelope of the detection.

These two direct current voltages are applied to two magnetic deflection circuits 65 and 66 in cathode ray tube 64, and, according to whether the rotor happens to be in the half revolution for which the induced voltages are in phase or in the one where they are in opposition of phase, spot 67 of the cathode ray tube will be deflected to position 68 or 69 on the fluorescent screen.

The deflection of the spot to the right or left can obviously be limited as desired, either by means of a suitable clipping circuit, by some antifading device or by any other well known device, in order that the spot be able easily to reach positions 68 and 69, without going beyond them too much.

When rotor 59 of the radio direction finder nears zero, i. e. the position where the phase of its current changes, since the radio or high frequency voltage induced in this rotor is of very reduced amplitude, it is obvious that the spot will be progressively less deflected and near center 67 of the screen. As the rotor actually passes through the zero position no force whatever will be generated by one of the magnetic deflection circuits and the spot will be exactly at the center of the screen. Said spot will move over to the other side of the screen when the finder goniometer dial will continue rotating, since the phase of the system will have been inverted In the circuit of Figure 5, as well as in the circuits described in the copending application, it will be noted that it has been made possible to restore constant level of the modulation at the output of low frequency amplifier 52 by correcting the amplitude of the amplified current by means of a sine wave current of suitable phase angle produced by generator 60 and opposing the other current supplied by generator 60 to modulate the high frequency current in circuit 54.

The circuit of Figure 5 thus permits the shift of the spot of cathode ray 64 toward the right or left according to the position of the rotor of the goniometer finder. All that is left to be done, therefore, is to associate this circuit with the one described above in order to obtain a manually operated radio direction finder, the indicator reading of which gives at one and the same time close visual tuning control and a unilateral bearing of the transmitter (free from the 180° ambiguity as to sense) without the need for any keying or special operation in order to eliminate the 180° ambiguity.

Figure 6:
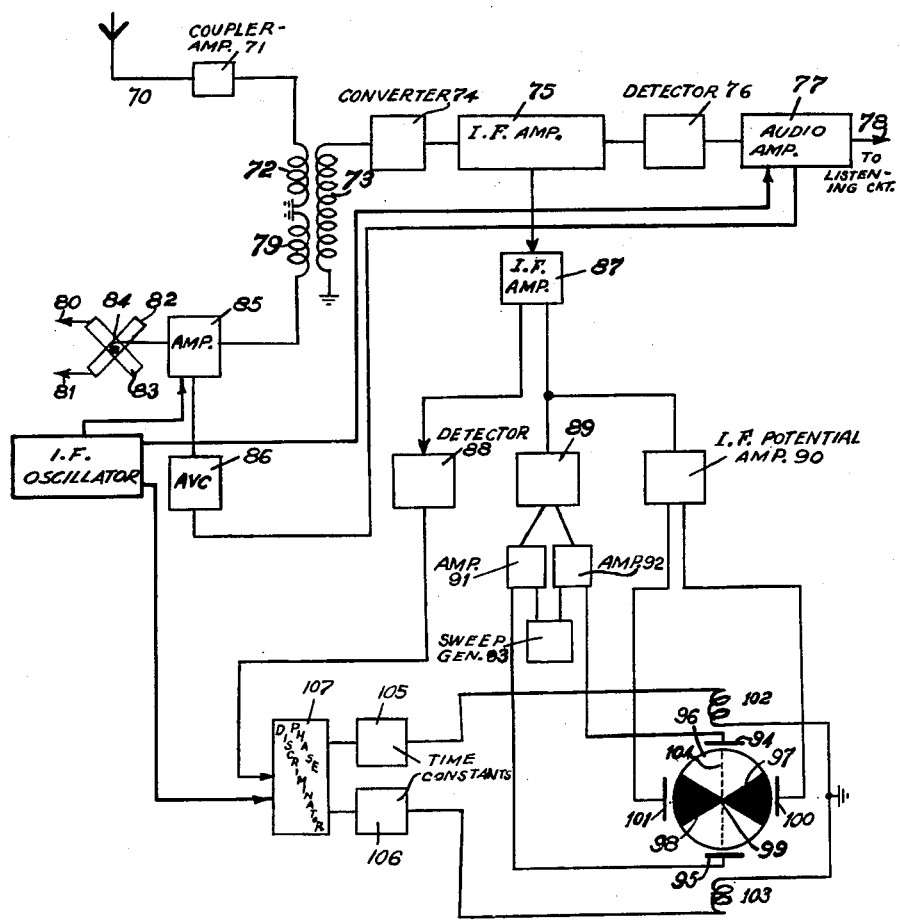
Figure 6 is a schematic of a radio direction finder goniometer embodying a pattern shift arrangement.

On Figure 6, for instance, will be seen a schematic of a radio direction finding installation which embodies the means described above to shift the pattern according to the phase of the high frequency current in the rotor of the finder and to produce a pattern by means of the high frequency currents received by the receiver.

Antenna 70 and coupling circuit or amplification circuit 71 are connected through transformer 72—73 to the input circuit of the high frequency (frequency changing) receiver 74. The intermediate frequency amplifier 75 is connected to a detecting circuit 76 and to a low frequency amplifying circuit 77. The receiver assembly also comprises a listening circuit 78 and an amplification correcting circuit 86, which restores constant value to the level of the low frequency envelope curve.

The crossed pattern wave collecting arrays 80 and 81 are connected to two rotors 82 and 83 of a goniometer finder, a third rotor 84 of which is connected to a symmetrical amplifier input circuit 85, itself connected by transformer 79—73 to the radio direction finding receiver. When the receiver is tuned to a transmitter, a part of the intermediate frequency current is routed, for instance, through intermediate frequency amplifier 87. For listening purposes, the selectivity of the circuit may be made variable or given a value at least sufficient to permit adequate reception of an audible modulation while, where two stations are extremely close to each other, it may be of interest to have a radio direction finding circuit capable of separating them.

In the usual designs used for manually controlled radio direction finders, it is impossible to reduce the width of the passing band below a certain value, since direction finding is effected by aural means. In the devices of the invention, on the contrary, since listening in is independent of the finder circuits, the passing band of intermediate frequency amplifier 87 can be reduced to a few hundreds of C. P. S. It then becomes possible independently to take the bearings of two stations that are exceedingly close to each other, while hearing them simultaneously.

Selective intermediate frequency amplifier 87 is thus connected, on the one hand to detector 88 which feeds phase discriminator 107, already described in the copending application, and which serves to generate two time constant voltage circuits 105 and 106. These voltages act to cause this lateral shift of the pattern on the screen of cathode ray tube 96 by means of magnetic deflection coils 102 and 103. On the other hand, intermediate frequency amplifier 87 feeds circuit 90 which amplifies an intermediate frequency voltage and applies it to horizontal deflection plates 100 and 101, of cathode ray indicator tube 96.

Circuit 89, as already described in connection with Figure 1, feeds the other pair of plates by means of intermediate frequency currents which are in phase or in opposition of phase, through two symmetrical stages 91 and 92 alternately modulated in amplitude by generator 93. One thus obtains, when the set is tuned to a station, two luminous triangles 97 and 98, formed by a luminous line which oscillates rapidly around point 99, when there is no lateral deflecting field, said point 99 is on vertical reference line 104. But when rotor 84 is not in a position at which there is equal reception through arrays 80 and 81, there is a stronger deflecting current in one of the windings 102 or 103 than in the other, and the pattern is thus shifted, as a whole, to the right or to the left of reference line 104.

Listening circuit 78 makes it possible, by means of omni-directional antenna 70, to listen in to the staton to which the receiver is tuned, and the circuit of the radio direction finder permits to take a bearing on said station without having to operate an ambiguity eliminating system, since the sense can easily be taken by observing the displacement of the pattern or image on indicator tube 96, both listening and direction finding operations being possible simultaneously. Moreover, with such a system, the range of the instrument is increased to what can be a considerable extent, since listening in is carried out by means of an antenna whose effective height can be greater than that of the whole crossed pattern differential collector and also since, when the finder is at zero or null reception, the radio or high frequency being received by the receiver set still remains at the level coming in through the antenna.

The operator can thus carry out all the usual traffic operations in addition to his radio direction finding work. The sensitivity of the instrument, from the standpont of radio direction finding, will depend on that of the amplifier circuits, of the phase discriminating circuit and of the differential input circuit which connects the finder to the couping transformer.

As has been mentioned above, a regulating or "governor circuit" can be provided to keep the spot short of a certain limiting position to the right and left of the middle reference line. Figure 7 shows the variations or shifts of the pattern to the right or left of said line. With the goniometer locked on bearing 280° for instance, the pattern or image on the indicator is symmetrical with relation to the vertical reference line since reception is at zero. For a 10 degree shift of the finder to the right, the variation of the unit displacement of the spot with relation to the reference line will parallel the amplitude variation plotted as curve 108 and, to the left, that of curve 111. By means of a regulator of variable efficiency, it is possible to obtain more rapid changes of the spot position (for instance as shown at 114 and 115) or again less rapid (for instance those at 112, 113).

Figure 8 shows an embodiment of indicator 121 and of goniometer dial 116, in systems which embody some characteristics of the invention. A fixed reference such as 119, on a transparent mask 118, makes it possible to read graduation 117 of finder dial 116 while luminous pattern 121, 122 comes to a common apex 124, both triangles shifting to the right or left of reference line 120.

While I have described above the principles of my invention in connection with specific apparatus, and particular modifications thereof it is to be clearly understood that this description is made only by way of example and not as a limitation on the scope of my invention.

I claim:
1. For use with a manually operated radio direction finder having sense and directive antenna arrays, and cathode ray tube means having deflection plates and a screen as an indicating device; the combination comprising means for deriving a voltage corresponding to energy picked up by the directive antenna arrays, means for deriving current corresponding to the energy picked up by the directive and the non-directive arrays respectively, means for combining said derived currents, means for relating the phases of said last named currents to one another, means for establishing a luminous pattern on the cathode ray tube screen, means for controlling the amplitude of said pattern as a function of the mean voltage from said directive antenna, and means for controlling the position of said pattern on the screen as a function of the phase relationship of said directive and non-directive array currents.

2. The combination according to claim 1, wherein said phase relating means includes a phase discriminator, and said position controlling means includes a magnetic deflecting circuit forming part of a differential circuit for said cathode ray tube.

3. The combination according to claim 1, wherein said pattern establishing means includes a sweep generator and coupling means connected to said combining means.

RENÉ HARDY.

REFERENCES CITED

The following references are of record in the file of this patent:

UNITED STATES PATENTS

| Number | Name | Date |
|---|---|---|
| 2,252,063 | Cockerell | Aug. 12, 1941 |